(12) United States Patent
Vu et al.

(10) Patent No.: US 8,964,791 B2
(45) Date of Patent: Feb. 24, 2015

(54) METHOD AND SYSTEM FOR LOW POWER TRANSMISSION AND DATA ALIGNMENT

(71) Applicant: Freescale Semiconductor, Inc., Austin, TX (US)

(72) Inventors: Mieu Van Vu, Austin, TX (US); John J. Vaglica, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 317 days.

(21) Appl. No.: 13/649,461

(22) Filed: Oct. 11, 2012

(65) Prior Publication Data

US 2014/0105101 A1   Apr. 17, 2014

(51) Int. Cl.
*H04J 3/06*   (2006.01)
*H04L 1/00*   (2006.01)

(52) U.S. Cl.
CPC .................................. *H04L 1/0008* (2013.01)
USPC ...................................................... 370/504

(58) Field of Classification Search
USPC ............................................... 370/445–520
See application file for complete search history.

(56) References Cited

U.S. PATENT DOCUMENTS

| | | | |
|---|---|---|---|
| 5,790,057 A * | 8/1998 | Linde et al. ..................... | 341/68 |
| 6,829,229 B1 | 12/2004 | Palermo et al. | |
| 7,948,964 B1 * | 5/2011 | Khlat et al. ................... | 370/350 |
| 2009/0024756 A1 * | 1/2009 | Spalla et al. ................... | 709/231 |
| 2010/0135275 A1 * | 6/2010 | Storm et al. ................... | 370/349 |
| 2011/0191608 A1 * | 8/2011 | Vetteth .......................... | 713/310 |

OTHER PUBLICATIONS

Ericsson Ab et al., CPRI Specification v2.0 (Oct. 1, 2004) Interface Specification, 2004.
China Mobile Research Institute, C-RAN The Road Towards Green RAN, White Paper, version 2.5, Oct. 2011.
M. Bengtsson et al., Celtic Telecommunication Solutions, D1.4 Initial Report on Advanced Multiple Antenna Systems, Wireless World Initiative New Radio, Jan. 16, 2009.

* cited by examiner

*Primary Examiner* — Kwang B Yao
*Assistant Examiner* — Juvena Loo
(74) *Attorney, Agent, or Firm* — Terrile, Cannatti, Chambers & Holland, LLP; Michael Rocco Cannatti (57) ABSTRACT

A method and apparatus automatically maintains a JESD204 serial data link (252) as active by using an idle signal (254) and multiplexer selection circuit (247) to selectively switch signal data samples (246) and dummy samples (0, . . . 0) onto a serial interface input to a JESD module (248) for serialization into a plurality of symbols for transmission over the JESD204 serial data link (252) in response to a transmit clock signal (253) so that serialized symbols generated from signal data samples are transmitted when there are signal data samples available, and serialized symbols generated from dummy samples are transmitted when there are no signal data samples available.

19 Claims, 5 Drawing Sheets

METHOD AND SYSTEM FOR LOW POWER TRANSMISSION AND DATA ALIGNMENT

BACKGROUND OF THE INVENTION

1. Field of the Invention

The present invention is directed in general to field of information processing. In one aspect, the present invention relates to the transfer of information over signal paths.

2. Description of the Related Art

Wireless communication systems increasingly use multiple RF transmission paths to transmit and receive over multiple antennas to achieve diversity benefits such as increased signal throughput, reliability and/or quality. However, multi-antenna base stations may have transmit or receive signal paths between the radio base station and the radio equipment antennas which have different signal path delays, thereby requiring delay adjustments so that data sent over different paths arrives at a destination together. In such cases, the different signal path delays can present challenges in meeting timing alignment requirements between radio transmitter branches such as imposed by 3GPP technical specifications which limit the deviation between transmission paths. For example, it can be especially challenging to keep serial interfaces along a given signal path aligned with the radio frame clock for the base station in the event of any link failure at the serial interface without requiring the baseband modem to perform the data re-alignment for the entire path, thereby degrading the network quality and negatively affecting the performance of the base station.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

A system, apparatus, and methodology are described for aligning the transmission and/or reception of signal data blocks across multiple signal paths having serial interface links in a multi-antenna wireless communication system. In selected embodiments, a single chip digital front end processor independently performs delay adjustment at a serial interface link with frame clock resolution to provide effective network start-up and link failure recovery. Minimum frame clock resolution delay adjustment accuracy may be controlled with a clock generator that is synchronous to the network radio frame and that generates synchronized frame clock signals that are applied to timers for associated serialized interfaces on the transmit and receive signal paths. In other embodiments, the single chip digital front end processor provides a lower power mode for maintaining serial interface link integrity between transmit and receive devices over each serial interface link by providing an idle transmission mode for a serial interface (e.g., a JESD204 serialized interface developed by JEDEC) which keeps the downstream serial interface link active while the transmit the transmit signal processor is placed in a low power mode or while the upstream serial interface link is being recovered. In selected embodiments, each JESD204 TX interface includes a multiplexer selection circuit that is controlled by an idle signal that is synchronous to the network radio frame. The output of the multiplexer selection circuit is connected to provide an output to a framer in the serialized interface. With one input connected to receive transmit data from a FIFO input buffer and another input connected to receive dummy data as a string of 0's, the multiplexer selection circuit outputs the dummy data when the idle signal has a first value (e.g., 0) to keep the link active, and outputs the IQ sample data when the idle signal has a second value (e.g., 1). By providing the serial interfaces with a power efficient startup and link failure recovery solution, radio network communications may be isolated from the impact of local link failures so that the serial interface link and re-aligned data may be recovered without requiring the modem to re-align data for the entire path.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

In this disclosure, Applicants have provided an improved system, apparatus, and method for aligning the transmission and/or reception of signal data blocks across one or more signal paths having a serial interface link (e.g., JESD204 serial interface link) that address various problems in the art where various limitations and disadvantages of conventional solutions and technologies will become apparent to one of skill in the art after reviewing the remainder of the present application with reference to the drawings and detailed description which follow.

Figure 1:
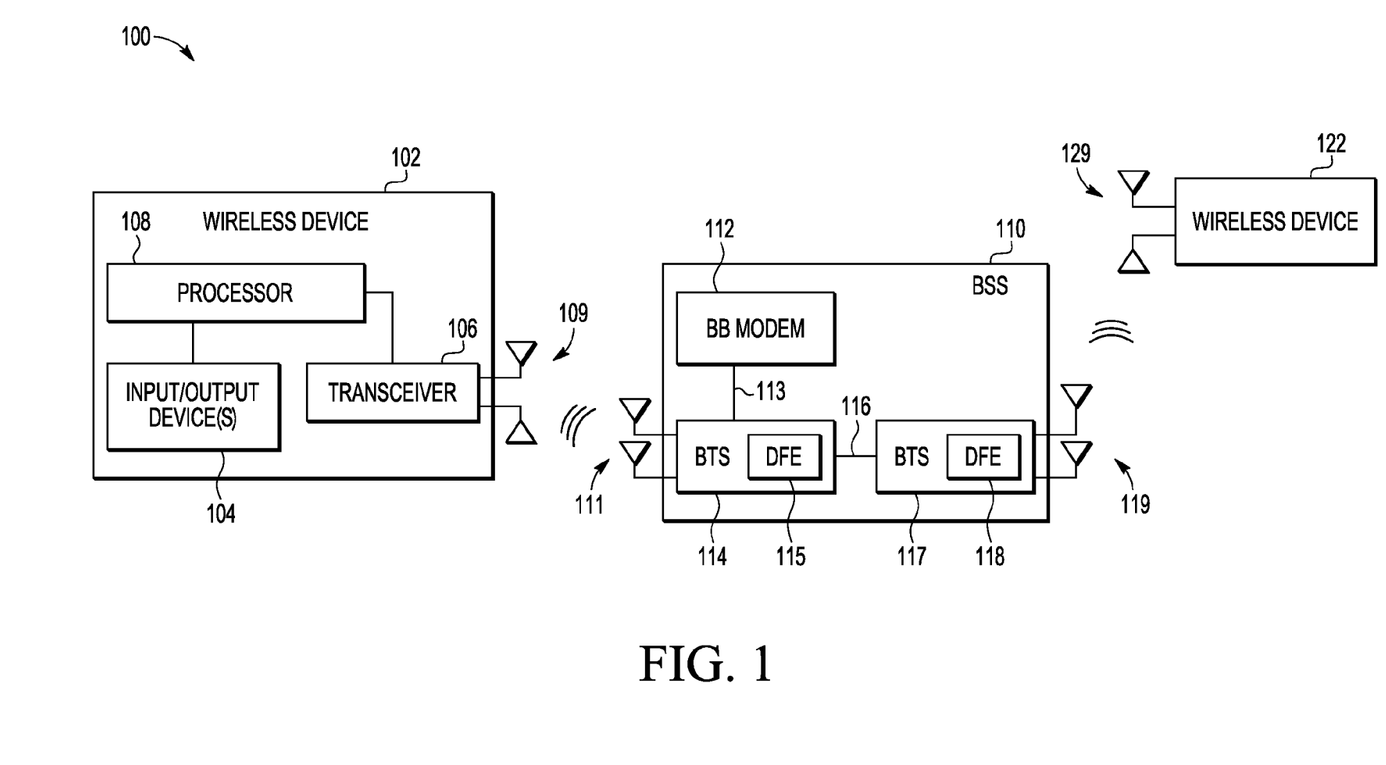
FIG. 1 is a simplified block diagram of a wireless communication system with a base station system deployed with a plurality of radio base station subsystems in accordance with selected embodiments of the present disclosure.

Turning now to FIG. 1, there is shown a simplified block diagram of a wireless communication system 100 that includes a plurality of wireless devices or subscriber stations 102, 122 (e.g., hand-held computers, personal digital assistants (PDAs), cellular telephones, etc.) that wirelessly communicate with one or more base station systems (BSS) 110 (e.g., enhanced Node-B or eNB devices). Each wireless devices (e.g., 102) may include a processor 108 (e.g., a digital signal processor), a transceiver 106 connected to one or more antennas 109, and one or more input/output devices 104 (e.g., a camera, a keypad, display, etc.), along with other components (not shown). The wireless devices 102, 122 use attached antennas 109, 129 to wirelessly communicate with the base station system (BSS) 110 via antennas 111, 119 to receive or transmit voice, data, or both voice and data.

In the depicted arrangement, the base station system 110 is deployed with a plurality of radio base station subsystems or nodes, including a baseband modem (e.g., radio equipment control device) and two base transceiver stations (BTS) 114, 117 connected to one or more antennas 111, 119 to function as radio equipment devices. However, it will be appreciated that any given node may have additional or fewer nodes. In the illustrated topology, the baseband modem 112 is connected over a network link 113 (e.g., CPRI link) to a first BTS 114, and the first BTS 114 is connected over a network link 116 (e.g., CPRI link) to a second BTS 117. While the radio equipment subsystems or nodes in the BSS 110 may be connected together in a variety of network topologies, a daisy chain topology is illustrated in FIG. 1.

In the embodiments shown, each base transceiver station 114, 117 includes a digital front end (DFE) processor 115, 118 which may be implemented as a single integrated circuit to provide the digital components of the cellular base station RF subsystem. The digital components consolidated on each DFE 115, 118 may include one or more control processors and digital transmit/receive filters, as well as interface peripherals and other I/O for RF subsystem functions. In addition and as described more fully below, each DFE 115, 118 may include one or more serial interface transmit modules (e.g., JESD204-TX modules) for aligning the transmission and/or reception of signal data blocks by providing a link recovery and delay adjustment mechanism which keeps the downstream serial interface link active by providing an idle transmission mode that is synchronous to the network radio frame.

Figure 2:
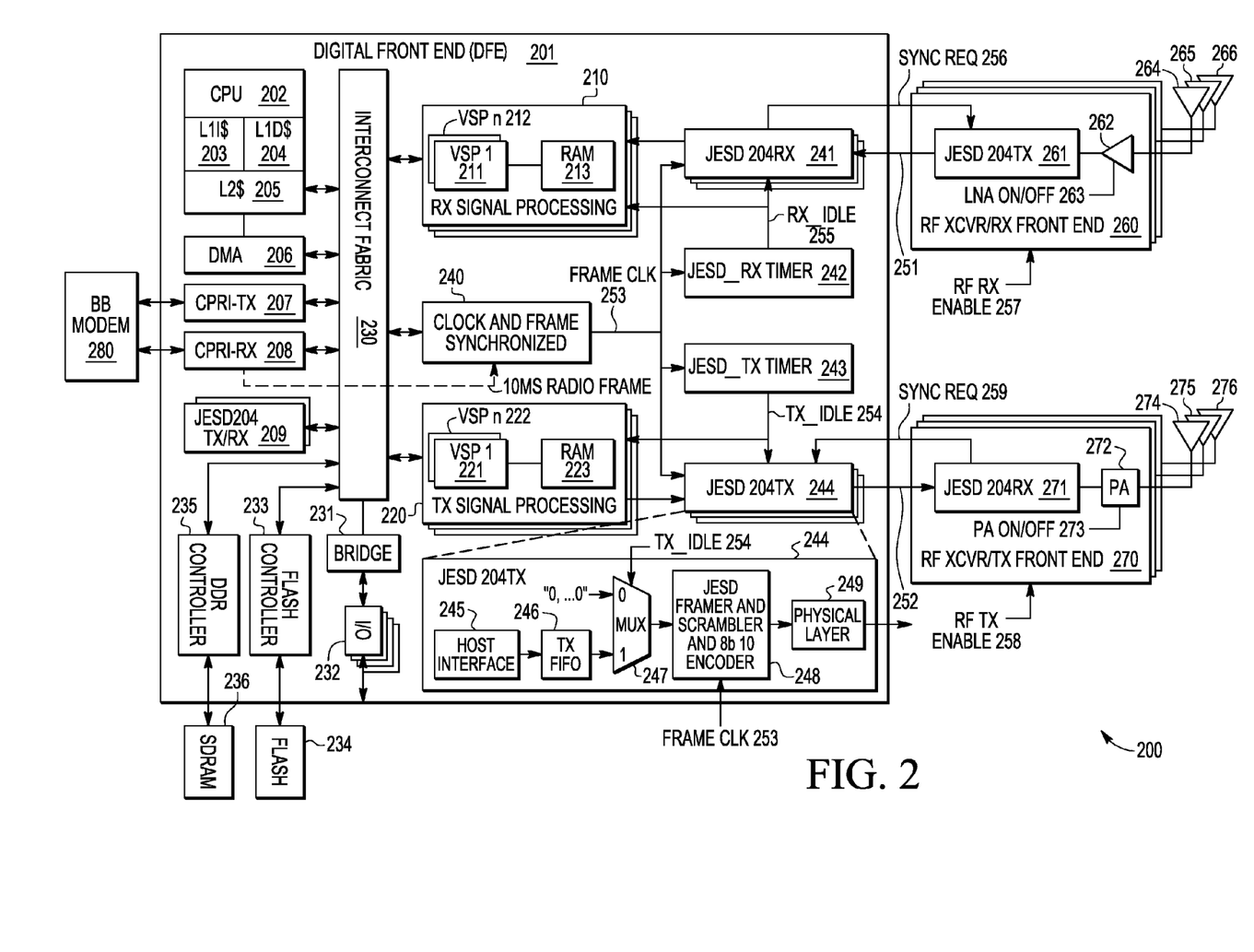
FIG. 2 is a block diagram illustration of a base station system having a multi-antenna radio frequency (RF) subsystem with a single chip digital front end (DFE) processor having integrated data flow and alignment control for transmit and receive paths in a radio base station subsystem.

To illustrate selected hardware-based techniques for aligning data and maintaining serial interface link integrity, reference is now made to FIG. 2 which is a block diagram illustration of a base station system 200 including a plurality of base station subsystems connected together. One of the base station subsystems is a base station controller subsystem 280 which provide a baseband modem function for the base station system 200. Connected to the base station controller subsystem 280 is a multi-antenna radio frequency (RF) subsystem that includes a single chip digital front end (DFE) processor 201 connected over one or more RF transceiver/receive front end circuits 260 and RF transceiver/transmit front end circuits 270 to one or more receive antennas 264-266 and transmit antennas 274-276, respectively. As will be appreciated, a transceiver/front end circuit may be understood to refer to all RF conversion circuitry between the antenna and the first intermediate frequency (IF) stage, including analog and digital receiver components (e.g., digital-to-analog converters, low pass filters, oscillators, splitters, mixers, amplifiers, etc.) that process the signal at the original incoming radio frequency (RF) before it is converted to a lower intermediate frequency (IF), and vice versa. For example and as shown in FIG. 2, the RF transceiver/receive front end circuit 260 includes a low noise amplifier (LNA) 262 coupled between the receive antennas 264-266 and a JESD 204TX interface 261. To turn ON and OFF the LNA 262, the DFE 201 generates an LNA ON/OFF signal 263. In addition, an RF receive enable signal control line 257 from the DFE 201 is used to turn ON and OFF the receive transceiver at the front end 260 with an RF RX enable signal, and a synchronization request control line 256 is used to convey synchronization requests from the JESD 204RX interface 241. Likewise, the RF transceiver/transmit front end circuit 270 includes a power amplifier (PA) 272 coupled between the JESD 204RX interface 271 and the transmit antennas 274-276. To turn ON and OFF the PA 272, the DFE 201 generates a PA ON/OFF signal 273. In addition, an RF transmit enable signal control line 258 from the DFE 201 is used to turn ON and OFF the transmit transceiver at the front end 270 with an RF TX enable signal, and a synchronization request control line 259 is used to convey synchronization requests from the JESD 204RX interface 271.

The depicted digital front end (DFE) processor 201 performs digital signal processing for the RF base station subsystem across the transmit antennas 274-276 and/or receive antennas 264-266 (which may be separate or shared antennas). To this end, the DFE processor 201 partitions transmit and receive signals to and from the antennas into transmit processing paths and receive processing paths, and communicates with the baseband modem 280 through the Common Public Radio Interface (CPRI) interface 207, 208 and/or JESD204A/B interface 209. The DFE processor 201 may include one or more control processors 202 (e.g., one or more ARM processor cores), memory subsystems (e.g., L1 instruction cache 203, L1 data cache 204, L2 cache 205), memory controllers (e.g., DMA controller 206, flash controller 233, and DDR controller 235) for interfacing with external memory (e.g., Flash memory 234, SDRAM 236), one or more modem interfaces (e.g., CPRI interfaces 207-208 and JESD204A/B interface 209), and I/O facilities (e.g., host bridge 231) for I/O devices 232. As a general matter, any of a variety of memory designs and hierarchies may be employed in, or in conjunction with, with the DFE processor 201. Also, it will be appreciated that the I/O devices 232 may include any desired I/O device, such as Ethernet, I2C, SPI, GPIO, and/or UART devices. All processor subsystems are linked by a multi-level interconnect fabric 230.

To digitally process transmit signals, the DFE processor 201 may also include a programmable transmit signal processing path for each transmit antenna 274-276 which is formed with a transmit signal processor 220 and one or more associated serialized interfaces 244 (e.g., a JESD204B TX interface) and RF transceiver/transmit front end module 270. The transmit signal processor 220 may include one or more processors 221-222 (e.g., vector processors) and associated memory 223 (e.g., RAM) for performing carrier-related signal processing and antenna-specific processing on IQ samples received from the baseband modem. Once transmit signal processing is completed, the transmit signal processor 220 may send the processed samples to an associated serialized interface 244 (e.g., JESD204B TX 244) for transfer to the transceiver/front end module (e.g., 270) over IQ signal lines 252. At the transceiver/front end module 270, the processed samples are received at a corresponding serialized receive interface (e.g., JESD204B RX 271), and then subsequently processed for transmission (including amplification at power amp 272). In this way, separate transmit signal paths may be formed for each of the transmit antennas 274-276.

In similar fashion, received signals may be digitally processed at the DFE processor 201 with a programmable receive signal processing path for each receive antenna 264-266. Each receive signal path is formed with a receive signal processor 210 and an associated serialized interface 241 and RF transceiver/receive front end 260 that is connected to a receive antenna(s) 264-266. The receive signal processor 210 may include one or more processors 211-212 (e.g., vector processors) and associated memory 213 (e.g., RAM) for performing receive signal processing on IQ samples received from the transceiver/front end 260 over one of the JESD receive interfaces 241. To facilitate transfer of received signal information between the receiver front end 260 and DFE 201, the transceiver/receiver front end 260 may include a serialized interface 261 (e.g., JESD204B TX 261) for transfer to the received signal information over IQ signal lines 251. At the DFE 201, the signal information is received at a corresponding serialized interface 241 (e.g., JESD204B RX 241). Once receive signal processing of the signals received over IQ signal lines 251 is completed, the receive signal processor 210 may send the processed samples to the baseband modem 280, such as by using the CPRI interface module 207. In this way, separate receive signal paths may be formed for each of the receive antennas 264-266.

As seen from the foregoing, the DFE processor 201 may support multiple transmit signal paths (e.g., for downlink or data streams from the base station controller to the antenna) and receive signal paths (e.g., for uplink or data streams from the antenna to the base station controller), where each transmit and receive signal path is controlled by different timers 243, 242.

As will be appreciated by those skilled in the art, the JESD204 interface (e.g., 244/271) relies on the multi-frame boundary (e.g., 32 ns resolution) for data transfer over IQ signal lines (e.g., 252) between the transmit device (e.g., DFE 201) and the receive device (e.g., transceiver/transmit front end 270). Since conventional JESD204 interfaces operate independently from the network radio frame timing and do not have any concept of radio frame timing used in the baseband modem, any link failure in the transmit or receive paths would require that the baseband modem perform data re-alignment for the entire path to/from the carrier antennas due to 3GPP requirements that the delay adjustment accuracy be less than or equal to 8.2 ns. This conventional approach for recovering and realigning data along the entire path degrades the network quality and impairs base station performance.

The performance inefficiencies and delays may be eliminated by providing each serialized transmit interface 244, 261 (e.g., a JESD204B TX interface) with integrated serial interface control hardware to isolate network communication from the impact of local link failures and to provide the affected modem card with the ability to recover the link and re-align data without requiring the baseband modem 280 to re-align data for the entire path. To isolate link recovery, each serialized transmit interface (e.g., a JESD204B TX interface 244) includes control hardware 245-249 which is controlled by a synchronized frame clock generator 240 and JESD TX timer 243 to keep the down-stream JESD link (e.g., link 252) active with a low power transmission of dummy data. To this end, the synchronized frame clock generator 240 applies a frame clock signal 253 (e.g., FRAME CLK) to the JESD TX timer 243 and JESD204B TX interface 244, while the JESD TX timer 243 applies to the JESD204B TX interface 244 a transmit idle signal 254 (e.g., TX_IDLE) having a minimum frame clock resolution delay adjustment accuracy which is synchronous to the network radio frame. To assist with link recovery on the serialized receive interface (e.g., a JESD204B RX interface 241), the synchronized frame clock generator 240 and associated JESD RX timer 242 may also generate a receive idle signal which also has a minimum frame clock resolution delay adjustment accuracy which is synchronous to the network radio frame. In this way, the serialized JESD204B TX interface 244 may enter an idle transmission mode to keep the down-stream link active while a transmit processor (e.g., VSP 221) is in low power mode.

In accordance with selected embodiments, each serialized transmit interface 244 may include integrated serial interface control hardware for aligning IQ data block transmissions from a DFE 201 over one or more transmit signal paths 252 to the RF transceiver/transmit front end 270 and its antenna(s) 274-276. In operation, the DFE 201 generates I and Q samples for a transmit signal path which are to be transmitted by the serialized transmit interface 244 to the serialized receive interface 271 and to the antenna(s) 274-276. The IQ data samples for each transmit signal path are stored in the antenna-carrier (AxC) containers (not shown) which hold user data for the transmit signal path over an antenna. Delivery and timing alignment of IQ data samples across the transmit signal path(s) is controlled by a clock generator and frame synchronizer 240 and transmit timer 243 which are programmed by the CPU 202 to generate a transmit idle signal 254 that is synchronous to the network digital radio frame. In the receive direction, the delivery and timing alignment of IQ data samples received across the receive signal path(s) 251 may also be controlled by the clock generator and frame synchronizer 240 and receive timer 242 which are programmed by the CPU 202 to generate a receive idle signal 255 that is synchronous to the network digital radio frame.

It will be appreciated that the serialized transmit interfaces (e.g., 244) may be implemented with any desired serialized interface (such as a JESD204 digital interface, including a JESD204, JESD204A or JESD204B digital interface), but may also be implemented with a parallel interface, an interface for mobile devices, or other protocols with similar capabilities. In selected base station embodiments where transmit data is serialized using JESD204, JESD204A, or JESD204B interfaces, each JESD204B TX interface (e.g., 244) may include a multiplexer selection circuit 247 connected to receive user data at a first "1" input from a host interface 245 connected in series with a FIFO input buffer 246 to provide data to the data "1" input from the host (e.g., VSP 221, 222). In addition, the multiplexer selection circuit 247 may be connected to receive dummy data (e.g., zero value data values) at a second "0" input, with the selection being controlled by a transmit idle signal 254. The output from the multiplexer selection circuit 247 is connected in series with a JESD framer/scrambler/encoder module 248 which serializes the IQ data samples for delivery to the physical layer 249 at the signal lines 252 (e.g., JESD optical cable link). In each transmit signal path, the FIFO input buffer 246 receives IQ data from the AxC containers at the host interface 245 (e.g., over the interconnect fabric 230) and stores the IQ data as a data packet. At the JESD framer/scrambler/encoder module 248, the received IQ data samples are processed by adding markers to frame each data packet. The 8-bit output from each framer sub-module may then be converted to 10-bit format with an 8b10b encoder prior to serialization.

With this configuration 245-249, the JESD204B TX interface 244 supports to an idle transmission mode and a normal transmission mode. In the normal transmission mode, the transmit idle signal 254 is applied to the multiplexer selection circuit 247 so that user data from the host interface is transmitted by the JESD204B TX interface 244 over the JESD link 252. The transmit idle signal 254 may also be used to signal the transmit signal processor 220 to prepare user data for transmission. However, when there is no user data to be sent across the JESD link 252, the JESD204B TX interface 244 may be switched to the idle transmission mode by setting the transmit idle signal 254 so that the multiplexer selection circuit 247 outputs dummy data values for automatic transmission over the JESD204B TX interface 244 over the JESD link 252. In this way, the idle transmission mode transmits dummy 0 values to keep the JESD-RX module 271 connected to the link and synchronized, and allows the VSP 221, 222 to be put in a low power mode to save power while keeping the link 252 active.

To control switching between normal and idle modes at the synchronous hardware switching mechanism 247, the JESD TX timer 243 generates the transmit idle signal 254 (e.g., TX_IDLE). In turn, the JESD TX timer 243 is synchronized to the network (10 ms) radio frame by receiving the reference frame clock 253 (e.g., FRAME CLK) from the clock generator and frame synchronizer 240. In selected embodiments, the JESD TX timer 243 operates at twice the frequency of the frame clock 253 (FRAME CLK) to generate the transmit idle signal 254 (e.g., TX_IDLE) that is synchronous to the network (10 ms) radio frame. In addition, the timing of the transmit idle signal 254 is coordinated with the control signals provided to the transceiver/front end circuits 270 to maintain link integrity at the JESD links. In particular, the transmit idle signal 254 enables the JESD204B TX interface 244 to transmit user data over the JESD transmit link 252 only when the transmit transceiver front end 270 is transmitting (e.g., the "transmitter ON period"), but otherwise enables the JESD204B TX interface 244 to transmit dummy data (e.g., zero value data values) over the JESD transmit link 252 to keep it active.

Figure 3:
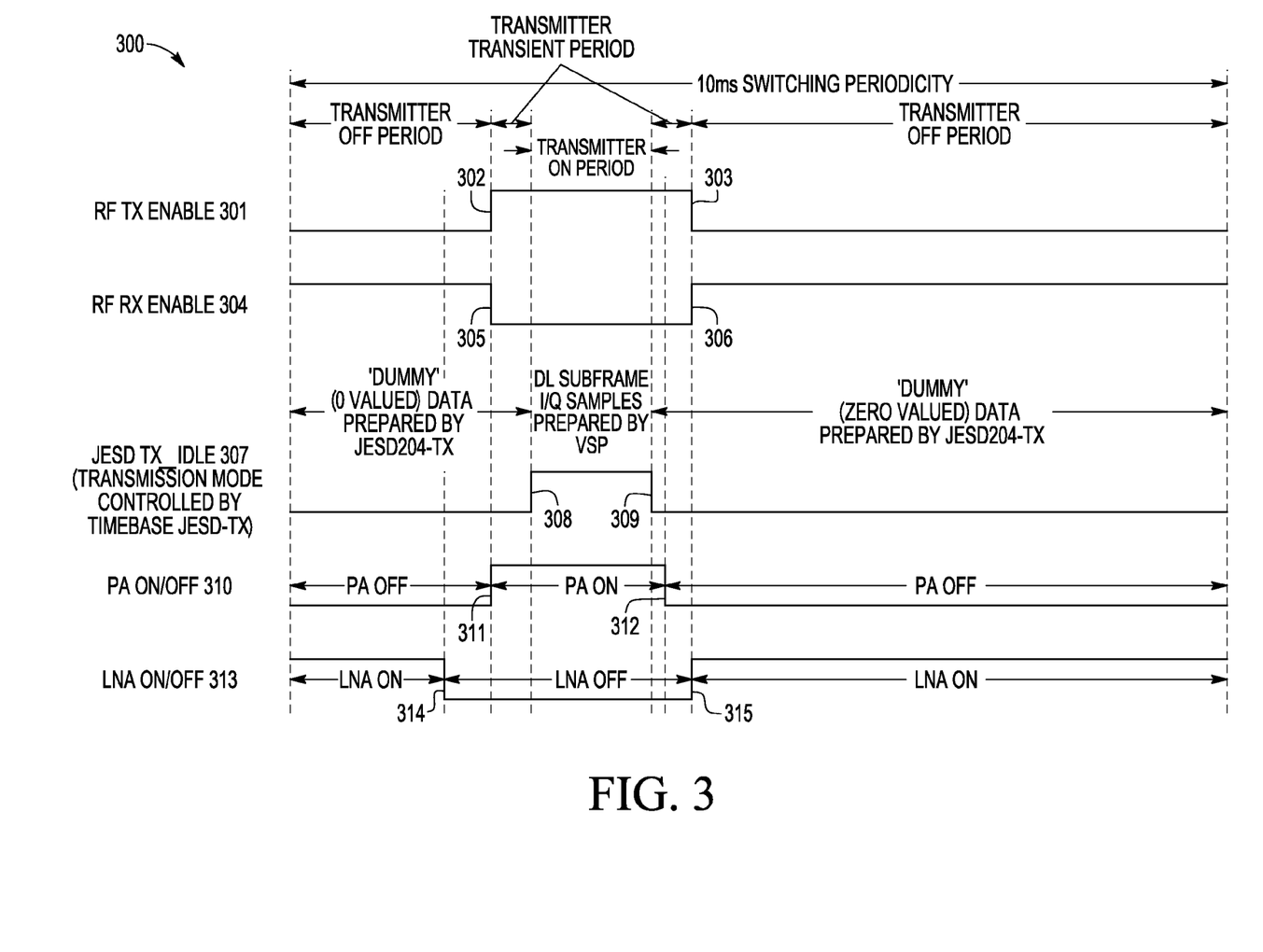
FIG. 3 is a timing diagram illustrating switching transmission mode for transmit and receive signal paths.

To illustrate the relative timing of the transmit idle signal 254 and transceiver/front end control signals, reference is now made to FIG. 3 which is a timing diagram 300 to illustrate a switching transmission mode for transmit and receive signal paths when used in a time division duplex (TDD) mode. In TDD mode, the RF transmitter is enabled to transmit data during the transmitter ON period, during which time the RF receiver is disabled from receiving data. Conversely, the RF transmitter is disabled from transmitting data during the transmitter OFF period, during which time the RF receiver is enabled to receive data. To control the relative operations of the RF transmitter and receiver, an RF Transmit Enable signal 301 may be generated to turn ON the RF transmitter by transitioning to a first value (e.g., "high"), and to turn OFF the RF transmitter by transitioning to a second value (e.g., "low"). The first transition 302 of the RF TX Enable signal 301 is controlled to provide a first transmitter transient period before the transmitter ON period begins, while the second transition 303 of the RF TX Enable signal 301 is controlled to provide a second transmitter transient period after the transmitter ON period begins. In support of TDD data transmission, a power amp on/off signal 310 is also applied to the power amp in the transceiver front end to provide power amplification through the entire transmitter ON period. To provide full power, the power amp on/off signal 310 has a first transition 311 to provide a first transmitter transient period before the transmitter ON period begins, and has a second transition 312 after the transmitter ON period (e.g., during the second transmitter transient period after the transmitter ON period begins.

In coordination with the RF Transmit Enable signal 301, an RF Receive Enable signal 302 is applied to turn OFF the RF receiver when the RF RX Enable signal 302 has the second value (e.g., "low"), but to turn ON the RF receiver when the RF RX Enable signal 302 has the first value (e.g., "high"). In the RF RX Enable signal 302, the first transition 305 is aligned with the first transition 302 of the RF TX Enable signal 301, and the second transition 306 is aligned with the second transition 303 of the first transition 302 of the RF TX Enable signal 301. In support of TDD data transmission, an on/off signal 313 is also applied to the low noise amplifier in the transceiver front end to amplify the received signal through a receiver ON period which is separated in time from the transmitter ON period. This is illustrated with the LNA on/off signal 313 where the first transition 314 to the second value (e.g., "low") occurs prior to the first transmitter transient period, and where the second transition 315 to the first value (e.g., "high") occurs after the second transmitter transient period.

The JESD transmit idle signal 303 is also controlled to coordinate with the RF Transmit Enable signal 301 so that the JESD transmit idle signal 303 transitions to the first value (e.g., "high") only during the transmitter ON period, but otherwise has the second value (e.g., "low") during the transmitter OFF period and transmitter transient periods. By applying the JESD transmit idle signal 303 to the synchronous hardware switching mechanism (e.g., 247), the JESD204B TX interface 244 transmits downlink IQ samples over the JESD link 252 only during the transmitter ON period, but otherwise transmits dummy data values over the JESD link 252 to keep it active.

Figure 4:
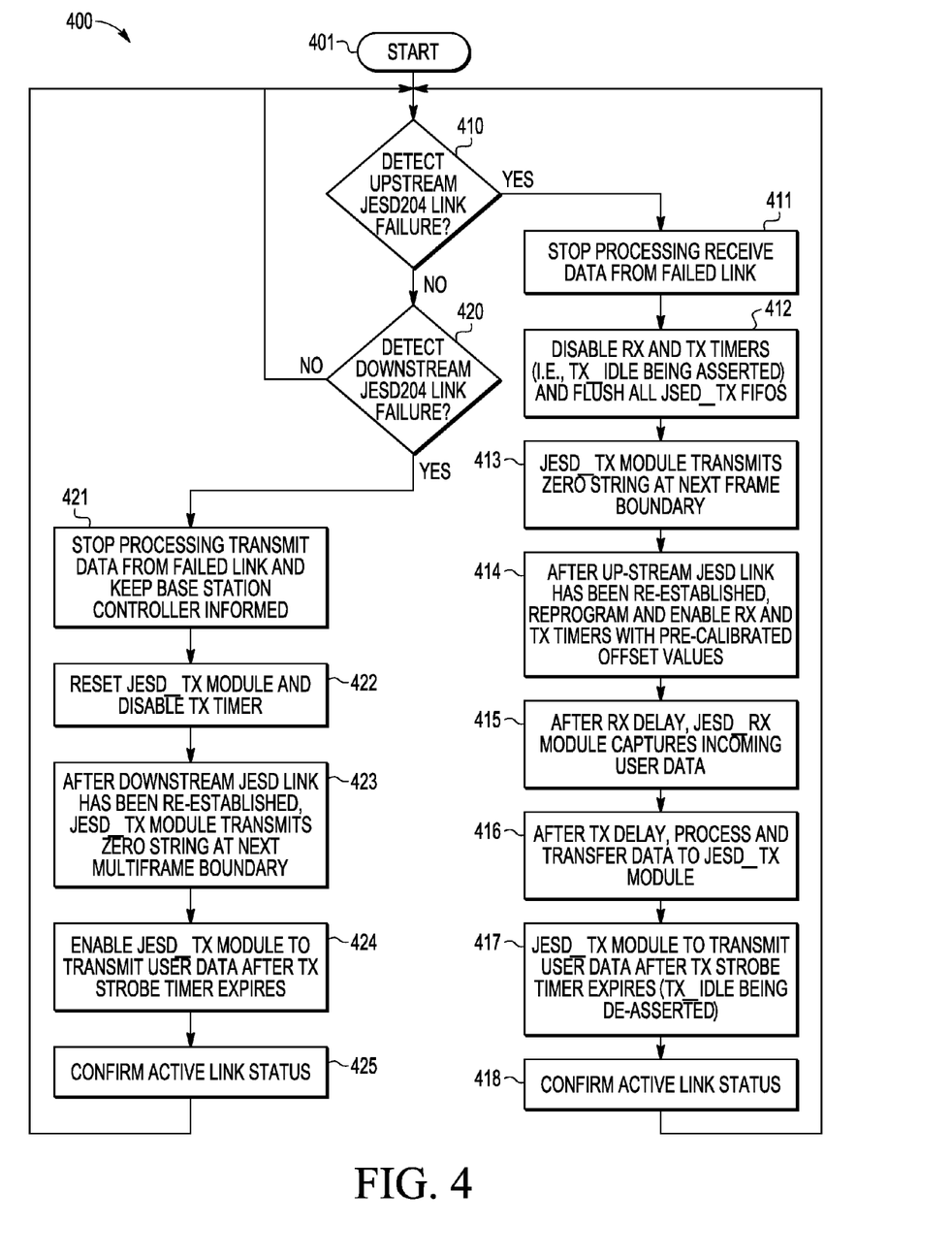
FIG. 4 shows an example flow diagram of a method for network recovery sequences for upstream and downstream serial interface link failures.

Referring now to FIG. 4, there is depicted an example flow diagram 400 of a method for network recovery sequences for upstream and downstream serial interface link failures in accordance with selected embodiments of the present disclosure. In the flow diagram 400, the method steps are performed by the serialized transmit interface and controlled by the DFE upon detection of a JESD204 link failure between the DFE and an associated transceiver in the RF subsystem. The disclosed methods provide a fast network start-up and recovery from link failure with minimum local software and modem intervention, and allow an upstream processor (e.g., an associated VSP) to be put in a low power mode or rescheduled to perform other task while the JESD204 link is active during an idle mode when the serialized transmit interface transmits dummy data over the JESD link. As described below, steps 410-418 provide an example network recovery sequence that may be implemented by the DFE in the event of a downstream JESD204 link failure, and steps 420-425 provide an example network recovery sequence that may be implemented by the DFE in the event of an upstream JESD204 link failure. Of course, the ordering of the upstream and downstream recovery sequence could be reversed, or only one of the recover sequences might be used in selected embodiments.

Once the method starts at step 401, one or more upstream JESD links are assessed to detect if there is an upstream link failure at detection step 410. For example, the detection step 410 may occur when the serial receive interface (e.g., JESD_RX module 545 at DFE 2 540 in FIG. 5) at the upstream link (e.g., JESD link 539) detects an under-run condition or synchronization error, at which point the serial receive interface (e.g., JESD_RX module 545) sends a SYNC request to the upstream serial transmit interface (e.g., JESD_TX device 537 DFE 1 520 in FIG. 5, or to an off-chip device) and informs the controller (e.g., CPU) about the synchronization issue.

Upon detection of an upstream JESD204 link failure (affirmative outcome to detection step 410), the local DFE (e.g., DFE 2 540 in FIG. 5) stops processing receive data from the failed link (step 411). For example, the controller may notify the baseband modem about the link failure status, abort all DMA channels associated with the failed JESD204 link 539, and stop any VSP (e.g., 549) from processing data from the failed link(s).

Once the receive data processing is halted, the associated receive and transmit timers may be disabled at step 412. When the JESD_RX timer (e.g., 544) and the JESD_TX timer (e.g., 556) are disabled, the transmit idle signal (e.g., TX_IDLE 533) is asserted. Subsequently, all FIFOs of the JESD_TX device (e.g., 557) associated with the failed link may be flushed at step 412.

After its FIFOs are flushed and the JESD_TX timer 556 is disabled, the serial transmit interface (e.g., JESD_TX module 557 at DFE 2 540 in FIG. 5) starts transmitting the "zero valued" or dummy data over the link 559 at the next frame boundary at step 413. To support the transmission of dummy data, the JESD_TX module 557 may include the synchronous hardware switching mechanism for multiplexing the dummy data string into a JESD framer/scrambler/encoder module at the JESD_TX module 557.

At step 414, the receive and transmit timers are reprogrammed. For example, upon detecting an initial lane synchronization interrupt from the JESD_RX module 545 associated with the recovered link 539, the controller may re-program and enable the associated JESD_RX and JESD_TX timers 544, 556 with the pre-calibrated offset values that are specified at system start up.

At step 415, the JESD_RX module 545 associated with the recovered link 539 starts capturing incoming user data from the serial transmit interface (e.g., JESD_TX module 539 at DFE 1 520 in FIG. 5) after a specified delay. This may be implemented by waiting for a receive delay timer (e.g., JESD_RX Delay timer) to expire before asserting a receive delay strobe which enables the JESD_RX module 545 to start capturing in-coming user data.

At step 416, the local DFE (e.g., DFE 2 540 in FIG. 5) re-starts transmit operations over the downstream JESD link 559 by preparing the JESD_TX device 557 after a specified delay. This may be implemented by waiting for a delay timer (e.g., JESD_TX DMA timer) to expire before enabling DMA transfers to the JESD_TX device 557 and triggering the VSP 549 to process and transfer data to the FIFO of JESD_TX device 557.

At step 417, the JESD_TX module 557 is switched to transmit user data over the downstream JESD link 559. For example, this may be implemented by waiting for a delay timer (e.g., JESD_TX Strobe timer) to expire before de-asserting the TX_IDLE signal 553 to effectively instruct the JESD_TX module 557 to immediately switch from "zero values" data to transmitting the user data.

At step 418, the link active status is confirmed, and the method returns to detection step 410. This confirmation may be accomplished by providing the TX_IDLE signal 553 to the VSP 549.

Referring back to step 410, if there is no upstream link failure detected (negative outcome to detection step 410), one or more downstream JESD links (e.g., 559) are assessed to detect if there is an link failure at detection step 420. For example, the detection step 420 may occur when the JESD_TX module 557 at the downstream link 559 detects a synchronization request from the associated JESD_RX module 564 and generates an error interrupt to the controller (e.g., CPU 202).

Upon detection of a downstream JESD204 link failure (affirmative outcome to detection step 420), the DFE stops processing transmit data from the failed link (step 421). For example, the controller may notify the baseband modem about the link failure status at JESD204 link 559, abort all DMA channels associated with all FIFOs at the JESD_TX module 557, and stop any VSP (e.g., 549) from processing data for the failed link(s) 559.

Once the transmit data processing is halted, the JESD_TX device 557 associated with the failed link 559 may be reset at step 422. In addition, the associated transmit timers may be disabled at step 422. When the JESD_TX timer 556 is disabled, the transmit idle signal (e.g., TX_IDLE 553) is asserted.

After JESD204 link 559 has been re-established, the JESD_TX module 557 starts transmitting the "zero valued" or dummy data over the link 559 at the next frame boundary at step 423. To support the transmission of dummy data, the JESD_TX module 557 may include the synchronous hardware switching mechanism for multiplexing the dummy data string into a JESD framer/scrambler/encoder module at the JESD_TX module 557.

At step 425, the link active status is confirmed, and the method returns to detection step 410. This confirmation may be accomplished by providing the TX_IDLE signal 553 to the VSP 549.

Figure 5:
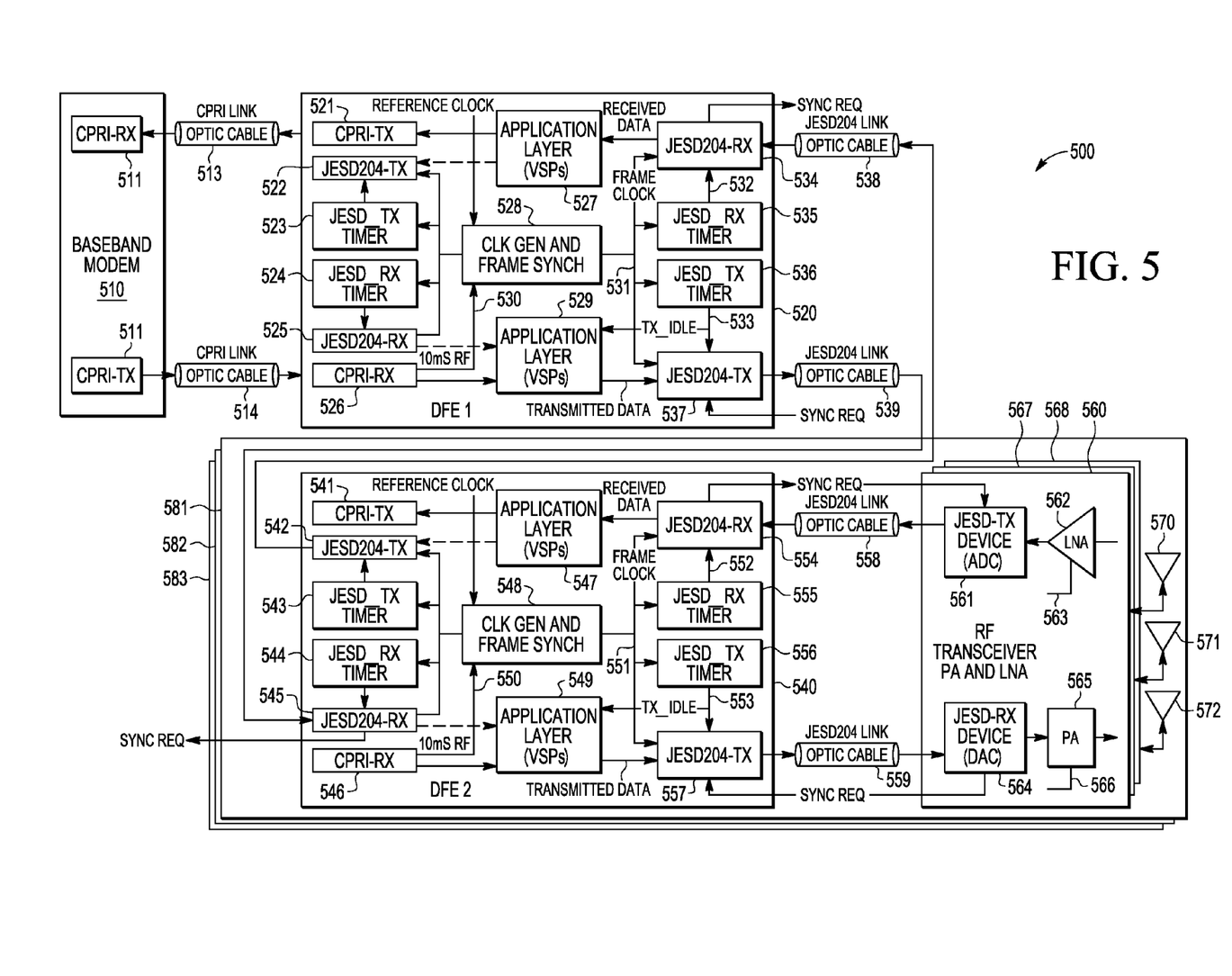
FIG. 5 is a block diagram illustration of a plurality of radio base station subsystems having integrated data flow and alignment control for transmit and receive paths.

To illustrate selected embodiments for controlling the data flow alignment across transmit and receive paths in a networked configuration of multiple radio base station subsystems, reference is now made to FIG. 5 which depicts a block diagram 500 of a plurality of radio base station subsystems connected in series, including a baseband modem subsystem 510, first DFE subsystem 520, and one or more remote radio head (RRH) subsystems 581-583, where each RRH subsystem (e.g., 581) may include a second DFE subsystem 540 connected in series with a plurality of RF transceiver subsystems 560, 567, 568 which are respectively coupled to a transmit/receive antenna system 570, 571, 572. In this configuration, the intermediate DFE subsystems 520, 540 are each implemented with a single chip digital front end (DFE) processor which consolidates digital signal processing for the RF base station subsystem. Thus, a first DFE base station subsystem 520 may include one or more control processors and associated memory subsystems and controllers 527, 529, along with integrated receive and transmit interface devices (e.g., CPRI-TX module 521, CPRI-RX module 526, JESD204-TX modules 522, 537, and JESD204-RX modules 525, 534) and timing control devices 523, 524, 528, 535, 536 for interfacing with external base station subsystems 510, 540 over the CPRI links 513/514 and/or JESD204 links 538/539 as depicted. In similar fashion, a second DFE base station subsystem 540 may include one or more control processors and associated memory subsystems and controllers 547, 549, along with integrated receive and transmit interface devices (e.g., CPRI-TX module 541, CPRI-RX module 546, JESD204-TX modules 542, 557, and JESD204-RX modules 545, 554) and timing control devices 543, 544, 548, 555, 556 for interfacing with external base station subsystems 520, 560 over the JESD204 links 538/539 and 558/559 as depicted. As will be appreciated, the radio transceiver front end 560 may include RF conversion circuitry between the antenna system 570 and the first intermediate frequency (IF) stage at the DFE base station subsystem 540, including a low noise amplifier 562 and associated LNA ON/OFF signal 563 connected to the transmit interface device (e.g., JESD204-TX module 561), and a receive interface device (e.g., JESD204-RX module 564) connected in series with a power amplifier 565 and associated PA ON/OFF signal 566.

As disclosed herein, each of the radio base station subsystems (e.g., 520, 540) may include integrated JESD serial interface hardware for automatically controlling the transmission and reception of data symbols over the JESD links 538/539, 558/559. For example, the JESD204-TX module 557 in the second DFE base station subsystem 540 may include dedicated JESD timing control and switching hardware that automatically maintains a JESD204 serial data transmit link 559 as active by using an idle signal (TX_IDLE 553) and multiplexer selection circuit in the JESD204-TX module 557 to selectively switch signal data samples and dummy samples (e.g., 0, . . . 0) onto a serial interface input to a JESD module at the JESD204-TX module 557 for serialization into a plurality of symbols for transmission over the JESD204 serial data link 559 in response to a transmit clock signal (e.g., Frame Clock 551) so that serialized symbols generated from signal data samples are transmitted when there are signal data samples available, and serialized symbols generated from dummy samples are transmitted when there are no signal data samples available. To align the transmission of signal data samples with the network radio frame signaling at the radio base station subsystems (e.g., 540), a local clock is generated at the clock generator and frame synchronizer module 548 which receives the network radio frame signal 550 that is extracted by the CPRI-RX module 546, and generates therefrom the frame clock signal 551 that is applied to the JESD204-RX module 554 and JESD204-TX module 557. In addition, JESD receive and transmit timers 555, 556 receive the frame clock signal 551 and generate therefrom first and second timer clock signals 552, 553. Under control of the frame clock signal 551 and second timer clock signal 553, the serialization of signal data samples at the JESD204-TX module 557 is synchronized to the network radio frame information 550, and the JESD204 serial data link 559 is maintained as a continuously active link by transmitting serialized symbols generated from dummy samples when there are no signal data samples available. In selected embodiments, the same integrated JESD serial interface hardware may be included in any one or more of the other JESD204-TX modules (e.g., 537, 542) to provide a fast network start-up and recovery from link failure with minimum local software and modem intervention.

As will be appreciated, the synchronous hardware switching mechanism, system and methodology described herein provide a way to align the transmission and/or reception of signal data blocks and to provide effective network start-up and link failure recovery by continuously maintaining an active JESD204 serial interface link without software intervention. Though the synchronous hardware switching mechanism may be embodied in hardware as a controller, frame clock generator, receive and transmit timers, and a multiplexer connected and configured to align data and maintain the JESD204 transmit link as continuously active, selected components of the synchronous hardware switching mechanism may be programmed with timer delay values and pre-calibrated offset values by processing circuitry (e.g., a processor or controller) executing software (e.g., including but not limited to firmware, resident software, microcode, etc.). Any such programming operation may be embodied in whole or in part as a computer program product accessible from a computer-usable or computer-readable medium providing program code for use by or in connection with a computer or any instruction execution system, where a computer-usable or computer readable medium can be any apparatus that may include, store, communicate, propagate, or transport the program for use by or in connection with the instruction execution system, apparatus, or device. Examples of a computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD.

By now it should be appreciated that there has been provided a circuit, method and system for operating a base station subsystem. In the disclosed circuit, method, and system, signal data samples and dummy samples are generated for transmission over a first high speed serial data link, such as a JESD204-compliant serial interface link. For example, the signal data samples may be generated by performing carrier-related signal processing and antenna-specific processing on IQ samples received from a baseband modem, while the dummy samples may be generated as a string of zero values. In response to an idle condition having first and second values, the signal data samples and dummy samples are switched onto a serial interface input such that any available signal data samples are switched onto the serial interface input when the idle condition is of a first state, and dummy samples are switched onto the serial interface input when the idle condition is of a second state. In selected embodiments, an idle clock signal having first and second values is generated in response to the idle condition having first and second values. In selected embodiments, the switching may be implemented by applying the idle (clock) signal as a selection control input to a multiplexer selection circuit which has a first input connected to receive signal data samples and a second input connected to receive dummy samples (e.g., a string of zero values) for transmission over the first high speed serial data link when the idle condition is of the second state. In addition, samples from the serial interface input are serialized into a plurality of symbols for transmission over the first high speed serial data link (e.g., in response to a transmit clock signal). The serialization may be performed by framing bits of samples from the serial interface input into N-bit data words (e.g., N=8), mapping each N-bit data word to an M-bit symbol (e.g., M=10), and serializing each M-bit symbol for transfer over the first high speed serial data link. In this way, the plurality of symbols are transmitted over the first high speed serial data link so that the first high speed serial data link is maintained as active by transmitting serialized symbols generated from dummy samples when there are no signal data samples available. To control the timing of sample serialization and transmission, the transmit clock signal may be generated with a local clock generator and frame synchronizer such that the transmit clock signal is synchronous to a network radio frame so that serialized symbols generated from signal data samples are transmitted in alignment with the network radio frame. In selected example embodiments, the method and system may be used by a digital base transceiver station to transmit the symbols over a JESD204-compliant serial interface link to a radio frequency (RF) transceiver substation, thereby enabling a control processor at the base station subsystem/digital base transceiver station to enter a low power mode while maintaining the JESD204-compliant serial interface link as active by transmitting serialized dummy samples when there are no signal data samples available. The disclosed circuit, method, and system may also provide a plurality of RF control signals to a transceiver subsystem which is connected to receive the plurality of symbols over the first high speed serial data link to simultaneously disable RF signal reception and enable RF signal transmission at the transceiver subsystem when a transmission enable control signal is in a first phase, and to simultaneously enable RF signal reception and disable RF signal transmission at the transceiver subsystem when the transmission enable control signal is in a second phase.

In another form, there is provided an integrated circuit, method, and system for operating a first base station subsystem connected to a transceiver subsystem over a first high speed transmit serial data link and a second high speed receive serial data link used in a time division duplex mode. In the disclosed system and methodology, signal data samples and dummy samples are switched into a high speed transmit serial interface for serializing samples into a plurality of symbols in response to an idle signal (e.g., JESD_TX IDLE) having first and second phases, such that signal data samples are switched into the high speed transmit serial interface when the idle signal is in the first phase (e.g., HIGH), and dummy samples are switched into the high speed transmit serial interface when the idle signal is in the second phase (e.g., LOW). In selected embodiments, the idle signal may be used by the processor (e.g., VSP) to synchronize its processing functionality with the RF system hardware in TDD mode, and to determine whether it can start entering the low power mode (as no data sample is required) or exit from the low power mode (i.e. to prepare data sample for transmission). In selected embodiments, the signal data sample switching is implemented by applying the idle signal as a selection control input to a multiplexer selection circuit which has a first input connected to receive signal data samples, a second input connected to receive dummy samples, and an output, and then serializing samples from the multiplexer selection circuit output in response to a transmit clock signal that is generated with a local clock generator and frame synchronizer such that the transmit clock signal is synchronous to a network radio frame. The symbols generated by the high speed transmit serial interface are transmitted over the first high speed transmit serial data link (e.g., a JESD204-compliant serial interface link) to the transceiver subsystem so that the first high speed transmit serial data link is maintained as active by transmitting serialized symbols generated from dummy samples when there are no signal data samples available. In addition, RF control signals are provided to the transceiver subsystem to simultaneously disable RF signal reception and enable RF signal transmission when a transmission enable control signal (e.g., RF TX ENABLE) is in a first phase (e.g., HIGH), and to simultaneously enable RF signal reception and disable RF signal transmission when the transmission enable control signal is in a second phase (e.g., LOW). In selected embodiments, the RF control signals include a transmission enable control signal (e.g., RF TX ENABLE) and a receive enable control signal (e.g., RF RX ENABLE). The transmission enable control signal has first and second phases for respectively enabling and disabling RF signal transmission, where the transitions from the second phase (e.g., LOW) to the first phase (e.g., HIGH) in the transmission enable control signal precede transitions from the second phase (e.g., LOW) to the first phase (e.g., HIGH) in the idle signal by a specified transmitter transient period, and where transmission enable control signal transitions from the first phase (e.g., HIGH) to the second phase (e.g., LOW) are delayed by a specified transmitter transient period with respect to transitions from the first phase (e.g., HIGH) to the second phase (e.g., LOW) in the idle signal. The receive enable control signal (e.g., RF RX ENABLE) has first and second phases for respectively disabling and enabling RF signal reception, where the transitions from the second phase (e.g., LOW) to the first phase (e.g., HIGH) in the receive enable control signal precede transitions from the second phase to the first phase in the idle signal by the specified transmitter transient period, and where transitions from the first phase (e.g., HIGH) to the second phase (e.g., LOW) are delayed by a specified transmitter transient period with respect to transitions from the first phase (e.g., HIGH) to the second phase (e.g., LOW) in the idle signal. In addition or in the alternative, the RF control signals may include a power amplifier control signal (e.g., PA ON/OFF) and a low noise amplifier control signal (e.g., LNA ON/OFF). The power amplifier control signal (e.g., PA ON/OFF) has first and second phases for respectively turning on and off a power amplifier in the transceiver subsystem, where the transitions from the second phase (e.g., LOW) to the first phase (e.g., HIGH) in the power amplifier control signal precede transitions from the second phase (e.g., LOW) to the first phase (e.g., HIGH) in the idle signal by a specified transmitter transient period, and where transitions from the first phase (e.g., HIGH) to the second phase (e.g., LOW) are delayed by a specified transient period with respect to transitions from the first phase (e.g., HIGH) to the second phase (e.g., LOW) in the idle signal. The low noise amplifier control signal (e.g., LNA ON/OFF) has first and second phases for respectively turning off and on a low noise amplifier in the transceiver subsystem, where the transitions from the second phase (e.g., LOW) to the first phase (e.g., HIGH) in the low noise amplifier control signal precede transitions from the second phase (e.g., LOW) to the first phase (e.g., HIGH) in the power amplifier control signal by the specified transient period, and where transitions from the first phase (e.g., HIGH) to the second phase (e.g., LOW) are delayed by a specified transmitter transient period with respect to transitions from the first phase (e.g., HIGH) to the second phase (e.g., LOW) in the idle signal.

In still yet other embodiments, there is disclosed an integrated circuit and associated method of operation for use with a local base station subsystem connected to at least a first base station subsystem. The disclosed integrated circuit includes a first clock generator for generating a transmit clock signal that is synchronous to a network radio frame, and a second clock generator for generating an idle signal having first and second values. The integrated circuit also includes a transmit interface for transmitting symbols over a JESD204-compliant serial interface link to the first base station subsystem. The transmit interface includes a JESD204-compliant serial interface for serializing samples switched into the JESD204-compliant serial interface into a plurality of symbols for transmission over the JESD204-compliant serial interface link in response to the transmit clock signal. The transmit interface also includes a switching circuit for switching signal data samples and dummy samples into the JESD204-compliant serial interface in response to the idle signal, such that signal data samples are switched into the JESD204-compliant serial interface when the idle signal has the first value, and dummy samples are switched into the JESD204-compliant serial interface when the idle signal has the second value. In selected embodiments, the JESD204-compliant serial interface includes a framer for framing bits of input samples into 8-bit data words; an encoder for mapping each 8-bit data word to a 10-bit symbol; and a serializer for serializing each 10-bit symbol for transfer over the JESD204-compliant serial interface link. In other embodiments, the switching circuit includes a multiplexer selection circuit which has a first data input connected to receive signal data samples, a second data input connected to receive dummy samples, a first control input connected to receive the idle signal as a selection control input, and an output.

Although the described exemplary embodiments disclosed herein are directed to hardware-based methods and systems for aligning data and maintaining continuous link activity across JESD204 links without software intervention, the present invention is not necessarily limited to the example embodiments illustrate herein, and various embodiments of the circuitry and methods disclosed herein may be implemented with other devices and circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for operating a first base station subsystem, comprising:
    generating signal data samples for transmission over a first high speed serial data link;
    generating dummy samples for transmission over the first high speed serial data link;
    switching the signal data samples and the dummy samples onto a serial interface input in response to an idle condition having first and second values such that any available signal data samples are switched onto the serial interface input when the idle condition is of a first state, and the dummy samples are switched onto the serial interface input when the idle condition is of a second state;
    serializing the signal data and dummy samples from the serial interface input into a plurality of symbols for transmission over the first high speed serial data link;
    providing a plurality of RF control signals to a transceiver subsystem which is connected to receive the plurality of symbols over the first high speed serial data link to simultaneously disable RF signal reception and enable RF signal transmission at the transceiver subsystem when a transmission enable control signal is in a first phase, and to simultaneously enable RF signal reception and disable RF signal transmission at the transceiver subsystem when the transmission enable control signal is in a second phase; and
    transmitting the plurality of symbols over the first high speed serial data link, wherein the first high speed serial data link is maintained as active by transmitting the plurality of symbols generated from the dummy samples when there are no signal data samples available.

2. The method of claim 1, further comprising generating an idle clock signal having the first and second values in response to the idle condition having first and second values.

3. The method of claim 1, where the first high speed serial data link is a Joint Electron Devices Engineering Council (JEDEC) Standards Document JESD204-compliant serial interface link.

4. The method of claim 1, where switching the signal data samples and the dummy samples onto the serial interface input comprises applying an idle clock signal as a selection control input to a multiplexer selection circuit which has a first input connected to receive the signal data samples and a second input connected to receive the dummy samples.

5. The method of claim 1, where generating the dummy samples comprises applying a string of zero values for transmission over the first high speed serial data link when the idle condition is of the second state.

6. The method of claim 1, where serializing samples from the serial interface input comprises:
    framing bits of the signal data samples and the dummy samples from the serial interface input into N-bit data words;
    mapping each N-bit data word to an M-bit symbol; and
    serializing each M-bit symbol for transfer over the first high speed serial data link.

7. The method of claim 1, where serializing the signal data samples and the dummy samples from the serial interface input comprises generating a transmit clock signal with a local clock generator and frame synchronizer such that the transmit clock signal is synchronous to a network radio frame.

8. The method of claim 7, where transmitting the plurality of symbols over the first high speed serial data link comprises transmitting the serialized symbols generated from the signal data samples in alignment with the network radio frame.

9. The method of claim 1, further comprising enabling a control processor at the first base station subsystem to enter a low power mode while maintaining the first high speed serial data link as active by transmitting the plurality of symbols generated from the dummy samples when there are no signal data samples available.

10. A method for operating a first base station subsystem connected to a transceiver subsystem over a first high speed transmit serial data link and a second high speed receive serial data link used in a time division duplex mode, comprising:
    switching signal data samples and dummy samples into a high speed transmit serial interface for serializing the signal data samples and dummy samples into a plurality of symbols in response to an idle signal having first and second phases, such that the signal data samples are switched into the high speed transmit serial interface when the idle signal is in the first phase, and the dummy samples are switched into the high speed transmit serial interface when the idle signal is in the second phase;
    transmitting the plurality of symbols from the high speed transmit serial interface over the first high speed transmit serial data link to the transceiver subsystem so that the first high speed transmit serial data link is maintained as active by transmitting the plurality of symbols generated from the dummy samples when there are no signal data samples available; and
    providing a plurality of RF control signals to the transceiver subsystem to simultaneously disable RF signal reception and enable RF signal transmission when a transmission enable control signal is in a first phase, and to simultaneously enable RF signal reception and disable RF signal transmission when the transmission enable control signal is in a second phase.

11. The method of claim 10, where providing the plurality of RF control signals comprises:
    generating a transmission enable control signal having first and second phases for respectively enabling and disabling RF signal transmission, where the transitions from the second phase to the first phase in the transmission enable control signal precede transitions from the second phase to the first phase in the idle signal by a specified transmitter transient period; and
    generating a receive enable control signal having first and second phases for respectively disabling and enabling RF signal reception, where the transitions from the second phase to the first phase in the receive enable control signal precede transitions from the second phase to the first phase in the idle signal by the specified transmitter transient period.

12. The method of claim 11, where providing the plurality of RF control signals comprises:
generating the transmission enable control signal to have transitions from the first phase to the second phase which are delayed by a specified transmitter transient period with respect to transitions from the first phase to the second phase in the idle signal; and
generating the receive enable control signal to have transitions from the first phase to the second phase which are delayed by a specified transmitter transient period with respect to transitions from the first phase to the second phase in the idle signal.

13. The method of claim 10, where providing the plurality of RF control signals comprises:
generating a power amplifier control signal having first and second phases for respectively turning on and off a power amplifier in the transceiver subsystem, where the transitions from the second phase to the first phase in the power amplifier control signal precede transitions from the second phase to the first phase in the idle signal by a specified transmitter transient period; and
generating a low noise amplifier control signal having first and second phases for respectively turning off and on a low noise amplifier in the transceiver subsystem, where the transitions from the second phase to the first phase in the low noise amplifier control signal precede transitions from the second phase to the first phase in the power amplifier control signal by the specified transient period.

14. The method of claim 13, where providing the plurality of RF control signals comprises:
generating the power amplifier control signal to have transitions from the first phase to the second phase which are delayed by a specified transient period with respect to transitions from the first phase to the second phase in the idle signal; and
generating the low noise amplifier control signal to have transitions from the first phase to the second phase which are delayed by a specified transmitter transient period with respect to transitions from the first phase to the second phase in the idle signal.

15. The method of claim 10, where transmitting the plurality of symbols comprises transmitting the plurality of symbols over a Joint Electron Devices Engineering Council (JEDEC) Standards Document JESD204-compliant serial interface link.

16. The method of claim 10, where switching signal data samples comprises:
applying the idle signal as a selection control input to a multiplexer selection circuit which has a first input connected to receive the signal data samples, a second input connected to receive the dummy samples, and an output; and
serializing samples from the multiplexer selection circuit output in response to a transmit clock signal that is generated with a local clock generator and frame synchronizer such that the transmit clock signal is synchronous to a network radio frame.

17. The method of claim 10, further comprising enabling a control processor at the first base station subsystem to synchronize processing functionality at the first base station subsystem with the transceiver subsystem in the time division duplex mode, and to determine whether the first base station subsystem can enter a low power mode or exit from the low power mode.

18. An integrated circuit for a local base station subsystem connected to at least a first base station subsystem, the integrated circuit comprising:
a first clock generator for generating a transmit clock signal that is synchronous to a network radio frame;
a second clock generator for generating an idle signal having first and second values;
a transmit interface for transmitting symbols over a serial interface link to the first base station subsystem comprising:
a serial interface for serializing samples switched into the serial interface into a plurality of symbols for transmission over the serial interface link in response to the transmit clock signal; and
a switching circuit for switching signal data samples and dummy samples into the serial interface in response to the idle signal, such that the signal data samples are switched into the serial interface when the idle signal has the first value, and the dummy samples are switched into the serial interface when the idle signal has the second value; and a transceiver subsystem connected to receive the plurality of symbols over the first high speed serial data link, where the transceiver subsystem receives a plurality of RF control signals to simultaneously disable RF signal reception and enable RF signal transmission at the transceiver subsystem when a transmission enable control signal is in a first phase, and to simultaneously enable RF signal reception and disable RF signal transmission at the transceiver subsystem when the transmission enable control signal is in a second phase.

19. The integrated circuit of claim 18, where switching circuit comprises a multiplexer selection circuit which has a first data input connected to receive the signal data samples, a second data input connected to receive the dummy samples, a first control input connected to receive the idle signal as a selection control input, and an output.

* * * * *